United States Patent
Cioffi et al.

(10) Patent No.: US 7,454,013 B2
(45) Date of Patent: Nov. 18, 2008

(54) MULTIUSE TELECOMMUNICATIONS POWER SYSTEM

(75) Inventors: Alfonso J. Cioffi, Murphy, TX (US); Gregory H. Fasullo, Dallas, TX (US); Iftekhar Hasan, Richardson, TX (US); Melissa Molina, Dallas, TX (US)

(73) Assignee: Valere Power, Inc., Richardson, TX (US)

(*) Notice: Subject to any disclaimer, the term of this patent is extended or adjusted under 35 U.S.C. 154(b) by 669 days.

(21) Appl. No.: 11/019,692

(22) Filed: Dec. 21, 2004

(65) Prior Publication Data

US 2006/0146883 A1     Jul. 6, 2006

(51) Int. Cl.
*H04M 1/00* (2006.01)
*H04M 9/00* (2006.01)

(52) U.S. Cl. .................. 379/413; 379/413.01

(58) Field of Classification Search ............. 379/322, 379/323, 324, 413, 413.01
See application file for complete search history.

(56) References Cited

U.S. PATENT DOCUMENTS 5,712,779 A * 1/1998 Sheppard et al. .............. 363/69

* cited by examiner

*Primary Examiner*—Alexander Jamal
(74) *Attorney, Agent, or Firm*—Carr LLP

(57) ABSTRACT

A power system apparatus replaces outdated and presently unobtainable power systems originally deployed in a variety of RT communication cabinets, incorporating a plug-in programmable control module used to generate alarms in response to the detection of specified events and providing direct plug compatibility to those RT cabinet systems through the use of unique wiring harnesses. Support for advanced broadband and high speed communication circuits, neither originally envisioned nor designed into the original communication RT system, is now provided.

4 Claims, 5 Drawing Sheets

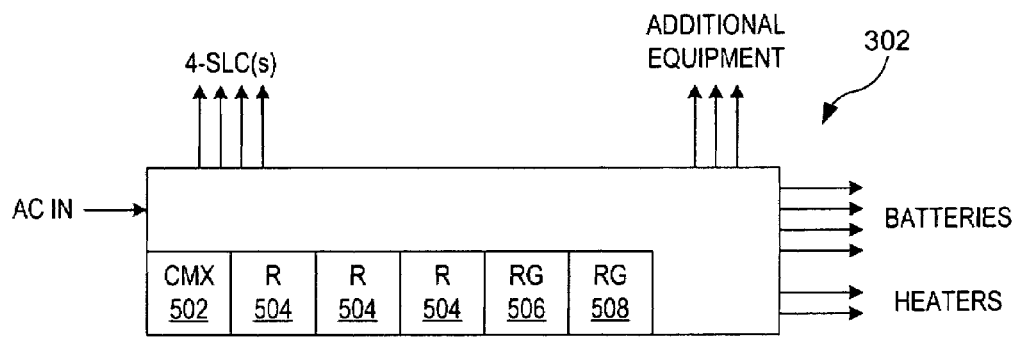
*FIG. 5*
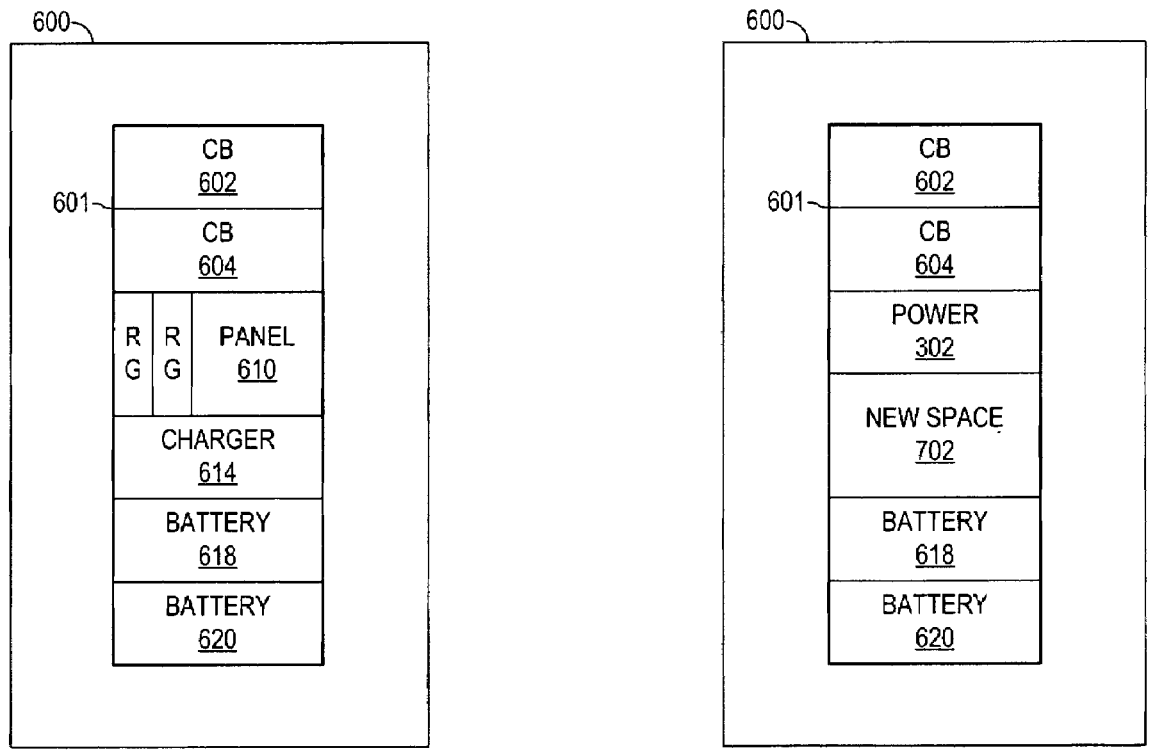
*PRIOR ART*
*FIG. 6*
*FIG. 7*

| EVENT | RT STYLE 1 | RT STYLE 2 | RT STYLE 3 |
|---|---|---|---|
| AC FAILURE | MINOR | MAJOR | NOT REPRESENTED |
| RECTIFIER FAILURE | MINOR | MINOR | NOT REPRESENTED |
| RINGER FAILURE | MINOR | MINOR | MAJOR |
| HIGH TEMPERATURE | MAJOR | MINOR | NOT REPRESENTED |
| EXTERNAL ALARM | MAJOR | MAJOR | MINOR |

MULTIUSE TELECOMMUNICATIONS POWER SYSTEM

TECHNICAL FIELD

The invention relates to a plug-compatible, and thus easily replaceable, power system for use in terminal enclosures remote from a central office (CO) that require additional power and/or space for additional circuitry within the enclosure.

BACKGROUND

Telephone companies have long used a plurality of remote terminals (RT) interconnected via high speed lines to central offices (CO) for economical distribution of "plain old telephone service" (POTS) via unshielded twisted pairs (UTP). COs are costly to build and maintain. Further, service from a CO over UTP is more difficult at increasing distances from the CO, especially distances over 20,000 feet. On the other hand, an RT can be installed on a very small amount of real estate. Also, the expenses involved in distributing and connecting the UTPs to customers from an RT is significantly less than the expenses associated with a CO at longer distances.

Although there are many types of remote terminals, controlled environment vaults (CEV), and so forth, a common limitation of those in existence for 20 years or more is that they were equipped to provide narrowband services only, and have no room for additional racks of equipment to provide broadband services. Many of today's customers want the capability of digital subscriber line (DSL) service and other advanced broadband services, electrically, optically or otherwise. DSL circuitry requires much more power than does POTS, partly because it is always in an ON condition. Thus, even if there was room in an enclosure for additional service such as DSL circuitry, the power generating system contained in a typical enclosure does not have sufficient additional capacity. The RTs also include batteries for backup power to keep telephone service operating during electrical power outages. Any increase of power usage in a RT would therefore reduce the backup time of the battery system. Thus, to maintain backup standards, additional batteries and space for the batteries would be required.

A typical small remote terminal would have room for one channel bank of POTS cards and one plug-in power system. The term "plug-in" is intended to define components with male or female connectors that can be quickly and easily replaced with new, or at least operable, components when an old component fails. A power system, as originally designed, would typically comprise one or two ring generators, a set of batteries, an alternating current (AC) rectifier and battery charger, a power and jack panel box, and a sensing circuit to switch the load between the rectifier and the batteries when the AC power is interrupted. A typical larger RT would have room for up to 4 channel banks and 2 power systems.

There has been no source of suitable replacement components of RT power systems for many years. The sensing circuit of the power system in the 1970s style RTs has been especially vulnerable to failure. A similar but different design of RT was introduced in the 1980s. The power system had slightly fewer individual components and somewhat different plug-in connectors but otherwise operated in substantially the same manner as the older RTs. Again, no new replacement power systems are available for the 1980s style RTs. It should be noted that since the interconnections were different, the power supplies of the newer systems could not be utilized in the older RT cabinets even if all the functional capabilities were identical. The non-identical functional capabilities include that at least some of the event-alarm signal conditions were configured differently from the conditions in the older RT cabinets.

It is standard practice in the telecommunications industry to fuse all wires emanating from a power system component box or enclosure, to the extent possible. The power systems in the above-referenced RTs thus had many fuses covering a major portion of the surface of the power and jack panel box that did not already contain test points and other connectors. Therefore, even if there was adequate power capability to power DSL circuits, there was no room in the old power systems for additional fuses or connections to any added circuits and required additional batteries.

It should further be noted that many of the power systems in the above-mentioned older RTs have no redundancy in the rectifier AC/DC conversion portion. Therefore, if a single component failed in the rectifier AC/DC portion, power was forced to be drawn from the batteries, alarms were raised and immediate maintenance attention was required to avert loss of telephone service to a large number of customers. Neither of the above-mentioned RTs utilized temperature compensation in the charging circuits for the batteries. For this reason, some of the maintenance calls required premature replacement of batteries, prior to the time they would have failed if environmental temperature were taken into account when determining the voltage at which the batteries were being charged, and thereby increased maintenance costs.

Another problem is that the controller for various sub-modules dictates all the sub-module actions. Thus when the controller fails, the entire system must be shutdown prior to replacement of the controller.

The power supplies used in these RTs were of a design that generated a considerable amount of heat. The RT enclosures, however, used passive heat dissipation as opposed to active means such as fans for removing heat from the enclosure. Thus the addition of any additional circuitry to an RT enclosure, while using a power source of the original design, would require attention to the heat dissipation of that circuitry.

Therefore, there is a need for a replacement power system that is plug-compatible with present power systems that are failing. Further, there is a need for power systems that can supply adequate power to an RT utilizing broadband circuitry and optics, as well as connect to and charge additional batteries, and/or provide additional over-current protected load connections. Even further, there is a need to reduce the size of any replacement power system, so that space is made available for additional banks of advanced broadband circuitry and optics that would otherwise have to be deployed in one or more additional or adjunct RT enclosures. Also, there is a need for redundancy in rectifying circuitry whereby the failure of a single component of the rectifying circuitry does not necessarily prevent the generation of power to a load. Additionally, there is a need to be able to replace the controller without shutting down the entire system in the RT and thus preventing calls by a large number of connected customers. Still further, there is a need to reduce maintenance costs by controlling the battery charging voltage as a function of temperature. Finally, there is a need to reduce the heat generated by any replacement power source to accommodate heat dissipated by any additional advanced broadband circuitry within the enclosure.

SUMMARY OF THE INVENTION

The present invention comprises a plug-compatible telecommunications remote terminal (RT) replacement power system having substantially increased power output, improved functionality, and a compact physical size to provide space and additional load connections in the RT for additional banks of circuitry.

BRIEF DESCRIPTION OF THE DRAWINGS

For a more complete understanding of the present invention, and its advantages, reference will now be made in the following Detailed Description to the accompanying Drawings, in which:

FIG. 5 provides additional detail of the power unit as used in FIGS. 3 and 4;

FIG. 6 illustrates one type of prior art installation of freestanding telecommunication rack equipment deployed in Controlled Environment Vaults (CEV) and Hut type RTs;

FIG. 7 illustrates the RT of FIG. 6 with the installation of a combination power unit;

DETAILED DESCRIPTION

Figure 1:
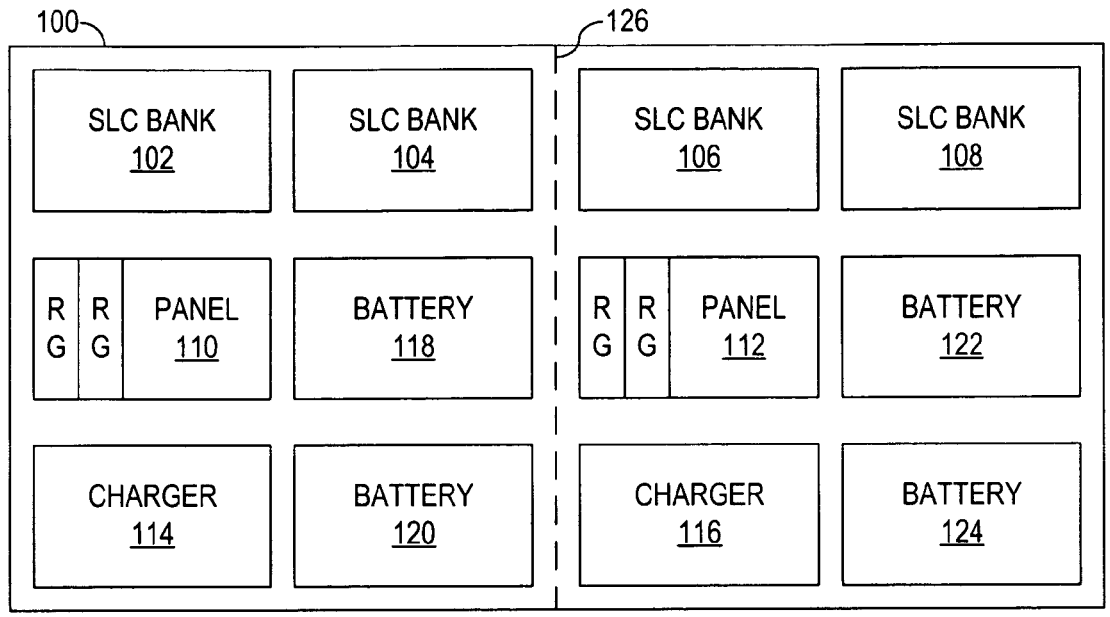
FIG. 1 is a block diagram of a first prior art remote terminal (RT) including subscriber loop carrier (SLC) banks, charger, ringers, distribution panel and batteries.

Referring now to FIG. 1, reference number 100 designates a prior art remote terminal (RT) enclosure. Within RT 100 channel banks 102, 104, 106 and 108 are distributed along a top row of sub-rack enclosed rail mounting positions. Blocks 110 and 112, on an intermediate row of rail mounting positions, comprise space for one or two ringers (RG) and a distribution panel. Battery charging units 114 and 116 are positioned on the bottom shelf or rail mounting position. Batteries 118, 120, 122 and 124 are positioned on both the intermediate and bottom shelves and rail mounting positions. The typical RT of this type is designed with front and back doors, the six components to the left of a dash line divider 126 being in the front half of the RT and the six components on the right side of divider 126 being in the back half of the RT, the front and back components thus being equally accessible.

Figure 2:
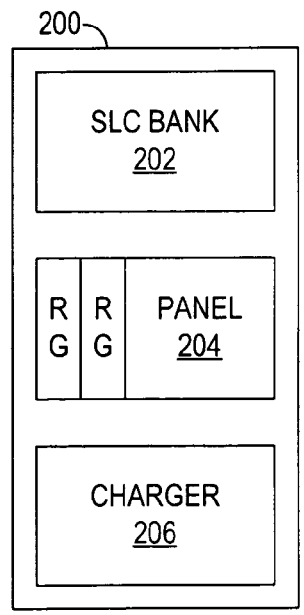
FIG. 2 is a block diagram of a second and smaller capacity prior art remote terminal (RT) including a single SLC bank, charger, ringers, distribution panel and batteries (not shown)

Referring now to FIG. 2, a smaller capacity prior art RT 200 has a subscriber loop carrier (SLC) channel bank 202 providing substantially the same function as block 102 of FIG. 1. Block 204 provides substantially the same function as block 110 of FIG. 1. A charger block 206 provides substantially the same functionality as block 114 of FIG. 1. While the blocks 202, 204 and 206 will operate in a manner similar to the comparable blocks 102, 110 and 114 in FIG. 1, the configuration of the interconnections between blocks will typically be different and the event/alarm signal generation logic may also be different. Therefore the panel and charger of FIG. 1 cannot be interchanged with the similar components of FIG. 2. In the back of the enclosure 200 there is space for batteries not shown.

Alternate configurations of prior art RTs 100 and 200 provide for storage of batteries outside the equipment enclosure. It should be noted that FIGS. 1 and 2 illustrate only two of the prior art types of RT enclosures and each type may have different cable configurations, lengths and terminating connector types emanating from the panels and chargers to the channel banks and batteries, respectively, as well as different event/alarm signal generation logic.

Figure 3:
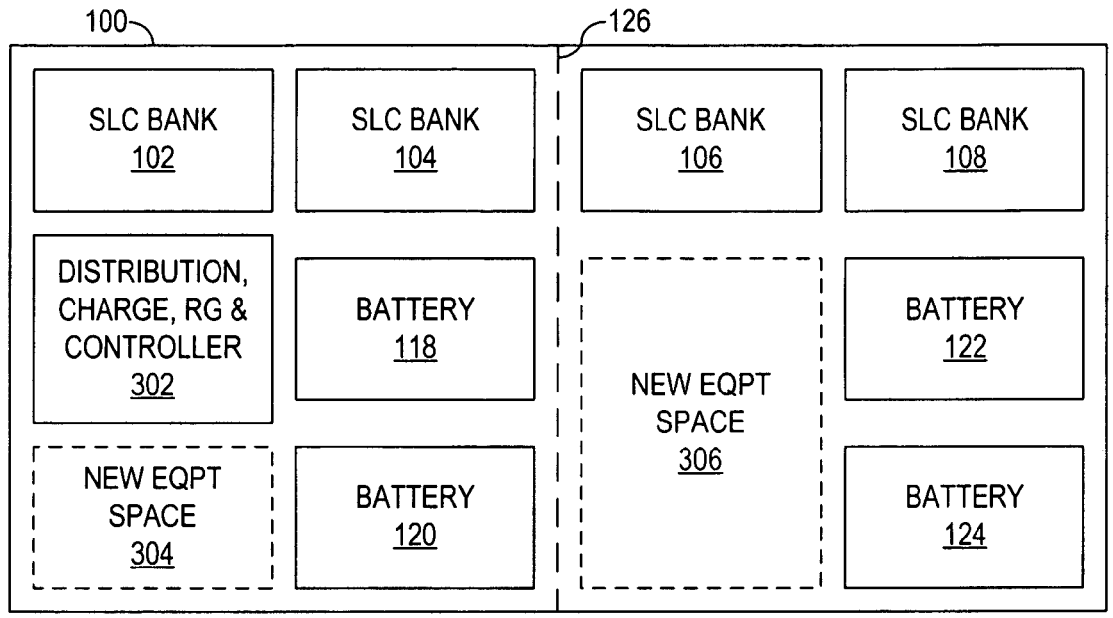
FIG. 3 illustrates the prior art RT of FIG. 1 with the installation of a combination power unit.

Referring now to FIG. 3 in conjunction with FIG. 1, the channel banks and batteries maintain the same designations, however, the panels 110, 112, and chargers 114, 116, of the prior art RT of FIG. 1 are replaced by a single unit, power supply block 302, that occupies approximately one-fourth (¼) the size of blocks 110, 112, 114 and 116. The power supply block 302 combines the functions of battery charging, ringing, distributing power signals and alarms of the prior art equipment. Additionally, a plug-in or otherwise replaceable controller in power supply block 302 checks at least one of battery and cabinet temperature whereby a battery supplied float voltage is varied as a function of temperature to extend battery life. Since power supply block 302 is smaller than the prior-art components that provide similar functions, space designated as 304 and 306 is available for additional equipment. Further, the rated output power capacity of power supply block 302 is greater than the combined capacity of chargers 114 and 116 of the prior art whereby additional power may be supplied to the channel banks if required. As will be discussed later, the single unit, power supply block 302, includes surface mounted connectors for distributing signals and power. Thus different style and configuration cable harnesses may be produced, custom designed for each different RT application, while using the same power supply block 302. These harnesses will have connectors at the far end that mate with and meet the configuration requirements of the channel banks and batteries in a given style RT enclosure.

Figure 4:
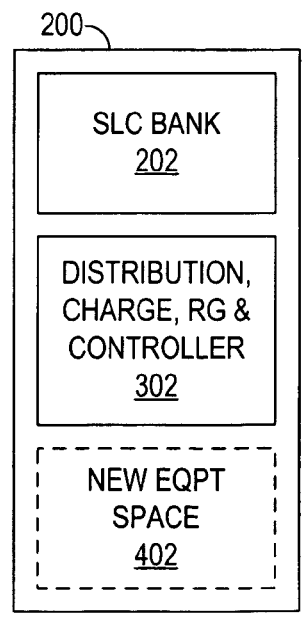
FIG. 4 illustrates the prior art RT of FIG. 2 with the installation of a combination power unit.

Referring now to FIG. 4 in conjunction with FIGS. 2 and 3, the enclosure 200 and the channel bank 202 are the same as in FIG. 2 however the blocks 204 and 206 of FIG. 2 are replaced by the power supply block 302 of FIG. 3. A different configuration harness will typically be used to interconnect the power supply block 302 to the channel bank 202 and the batteries. Since there is only one channel bank, only one of the four channel bank connectors on block 302 will be used in this configuration of an RT. Again there is now additional space available shown and designated as 402 for new equipment. Such additional equipment may be connected to a custom harness to connectors available for such equipment on the block 302.

Referring now to FIG. 5 the power supply block 302 contains a plug-in controller module (CM) 502, three plug-in rectifier modules 504, and two plug-in ring generator modules 506 and 508. The power supply block 302 also provides an AC input along with labeled outputs that, in the preferred embodiment, are in the form of connectors, whereby they can be connected to customized harnesses for application to a given RT enclosure. As shown, two of the rectifier modules supply rated power and the remaining rectifier module is essentially redundant until one of the rectifier modules fails, becomes inoperable or otherwise non-operational and is disconnected by the controller 502 upon detection of failure. In operation of a preferred embodiment, each of the modules 504 is delivering one-third (⅓) of the power until failure of one of the rectifier units. If the power supply block 302 of FIG. 5 were used in the RT enclosure 200 of FIG. 4, it is likely that only one rectifier module would be required to supply rated power. Thus for such an application, only two of the rectifiers modules would be required to supply N+1 redundancy. It may be noted that a set of outputs is labeled 4-SLC (s). This label is used to indicate that, for a given present design, there are four terminal connectors mounted on the power supply box. Thus, up to four SLC banks such as 102, 104, 106 and 108 may be connected at the same time. When used in the RT 200 shown in FIG. 4, only one of the four available connectors of power supply block 302 is interconnected through a cable to a SLC bank such as 202. However, when used in the configuration of FIG. 4, output alarm signals generated for application to the channel banks appear at unused terminal connectors as well as the one actually being used.

It should be noted at this point, that typically the alarm signal input connectors used in channel banks of one type of RT enclosure differed in configuration (size, shape, pin connections and so forth) from the connectors of channel banks used in another type of RT enclosure. The difference may also be only in the specific pin numbers at which a given alarm signal is to be applied. Further, the channel banks in different RTs were designed to respond to different sets of alarm signals as will be explained in connection with FIG. 11. For these reasons, the cables interconnecting the power supply block 302 to the channel banks of FIG. 3 are typically different than the ones connecting power supply block 302 to other RT channel banks such as those shown in the RTs of FIGS. 4, 7 and 9.

By using different wiring harnesses having the same configuration connector at the power supply end, the same power supply block 302 may be used to supply power and alarm signals for many different types of channel banks and/or different RT requirements. The major change being required in the power supply is to send different alarms signals for different sets of events. This can be accomplished by using differently configured plug-in control modules 502 in the power supplies used in different RT applications. Within power supply block 302 of FIG. 5, a block 502 is labeled CMx (control module X) to indicate that it is one of several logic configurations of control module that may be used in the power supply. The logic within the control modules is thus used to respond to events requiring alarm signals to be generated in different manners for different channel banks corresponding to different RT applications. The logic in the control modules may be either hard wired or software modified. The logic used in the control module is further explained in connection with FIG. 11. When the logic in such a control module is alterable for use in a given situation, it is commonly called, by those skilled in the art, as being "mappable".

Referring now to FIGS. 6 and 7 in conjunction with FIGS. 1 and 3, FIG. 6 illustrates a further prior art RT. An enclosure 600 is a Controlled Environment Vault (CEV) or Hut type RT enclosure that houses equipment in freestanding racks 601. Channel banks 602 and 604, shown within the RT 600, may be the same as or only similar in function to the blocks 102 and 104 in FIGS. 1 and 3. Further blocks 610, 614, 618, and 620 may be the same as or similar in function to the similarly designated blocks 110, 114, 118, and 120 respectively in FIG. 1.

In FIG. 7, which is similar to FIG. 6 except that it incorporates the teachings of the present invention, the blocks 602, 604, 618 and 620 of FIG. 6 are repeated. However, blocks 610 and 614 of FIG. 6 replaced by a power source such as block 302 of FIG. 3. A different configuration harness, as compared to those used in FIGS. 3 and 4, is typically used to interconnect the power supply block 302 to the channel banks 602 and 604, and to the batteries. Since there are only two channel banks, only two of the four channel bank connectors on power supply block 302 will be used in this configuration of an RT. Again there is now additional space available shown and designated as 702 for new equipment. Such additional equipment may be connected via a custom harness to additional terminals or connectors available (although not specifically shown) for such equipment on the power supply block 302.

Figure 8:
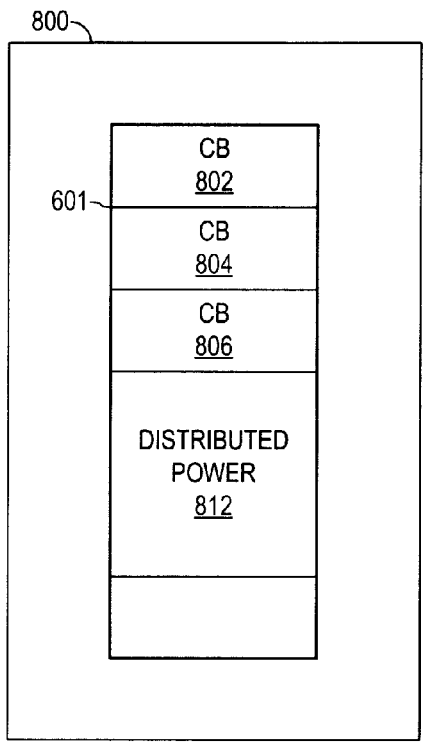
FIG. 8 illustrates another type of prior art installation, commonly known as distributed power architecture, that was deployed in Controlled Environment Vaults (CEV) and Hut type RTs where the equipment is deployed in freestanding telecommunication racks.
Figure 9:
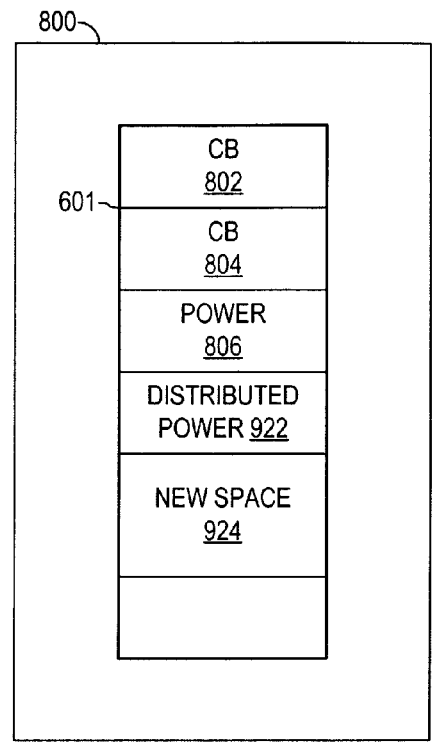
FIG. 9 illustrates the RT of FIG. 8 with the installation of a combination distributed power unit.

Referring now to FIGS. 8 and 9 in conjunction with FIGS. 6 and 7, FIG. 8 illustrates another prior art RT configuration, commonly referred to as a distributed power RT. Enclosure 800 is again a CEV or Hut type RT enclosure that houses equipment in freestanding racks 601. The channel banks 802, 804, and 806 are the same, or at least similar in operation to the blocks designated as "CB" in FIG. 6. Block 812 is commonly referred to as a distributed power panel and is similar in function to block 110, in FIG. 1, with the addition of a third port to support a third channel bank 806.

Figure 10:
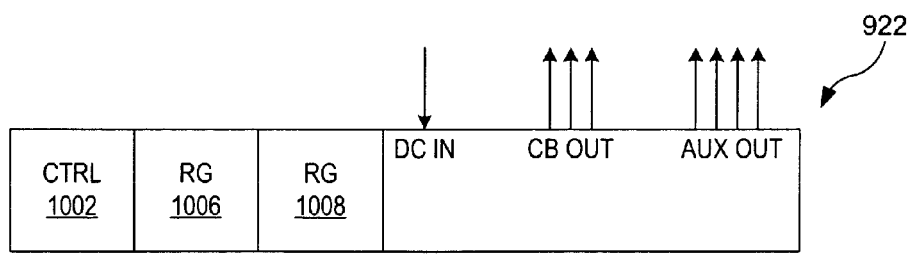
FIG. 10 provides additional detail of the distributed power unit shown in FIG. 9.

FIG. 9 illustrates the distributed power panel block 812 of FIG. 8 replaced by a distributed power block 922, which is shown in more detail in FIG. 10. The distributed power block 922 is essentially the same as power supply block 302 of FIG. 5 except that there are no rectifier modules such as 504. The power supplied to the RT 800 comprises voltage regulated DC (direct current). Thus distributed power block 922 may be configured as power supply block 302, less plug-in rectifier modules 504, and having DC input terminals. Again there is now additional space available, shown and designated as 924, for new equipment. Such additional equipment may be connected via a custom harness to connectors available for such equipment on the distributed power block 922 in a manner similar to that previously mentioned above.

FIG. 10 provides more detail for the distributed power block 922 of the previous figures. As shown there is a plug-in controller module 1002 and 2 plug-in ring generator modules 1006 and 1008. The distributed power block 922 also illustrates a DC input along with labeled outputs that, in the preferred embodiment, are in the form of connectors whereby they can be connected to customized harnesses for application to a given RT enclosure.

Figures 11, 12:
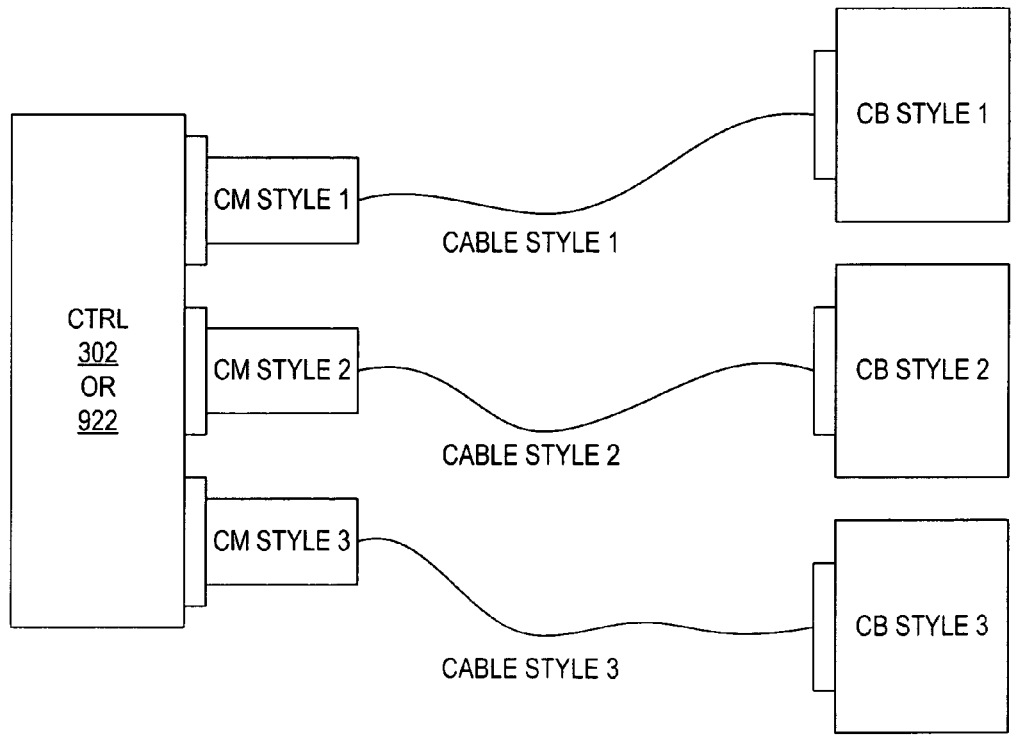
FIG. 11 comprises a representative logic chart used in explaining controller alarm mapping required and involved in providing required output data to the various configurations of channel banks in some the various RT deployments while using an essentially common power supply system.
FIG. 12 provides additional details of utilization of unique cable harnesses to provide operable connectivity to various configurations of channel banks from essentially the same power system in accordance with different versions of a power system control module associated with a given configuration of a connected channel bank.

Referring now to FIGS. 11 and 12 in conjunction with FIGS. 5 and 10, FIG. 11 illustrates several examples of environmental conditions or events that would cause various types of alarms to be enunciated and the manner in which several versions of the RT channel banks would expect to have those alarms presented. These alarm signals are transmitted through the channel banks back to a central office. If the alarm is indicated as major, appropriate maintenance action is given a higher priority than that given for a minor alarm. The various alarm signals generated, or not generated, in different RTs for given events was determined during initial design of the RTs. Even if the logic for having different alarm signal types for a given event in differently designed RTs is not known, the use of a programmable plug-in controller, in combination with an otherwise common power supply, provides identical alarms for specific events as was obtained when the RTs operated with the original power systems. In the preferred embodiment, the controller 502 and 1002 may be configured to provide each unique alarm by modification of stored software instructions. Alternatively, a hardware circuit or wiring modification may also provide that same alarm management function. In yet another embodiment, a simple hardware alarm unit may also be employed for this task.

FIG. 12 shows an illustrative example of how to utilize cable harnesses to provide electrical and physical connectivity from power blocks 302 and 922 to the various configurations of RT's and channel banks. The connectors on each of the three indicated CB styles all have different physical and electrical connection requirements at the CB end while maintaining identical connector connections at the power supply end for alarm signals. As also shown, the power supply system, whether similar to block 302 or 922, will include a control module mapped or otherwise configured to provide the same event responsive signals to the channel bank that the channel bank received from an original design power system.

It should be noted that event detection and alarm generation circuitry along with the rectifier circuitry, the temperature compensated float voltage circuitry and ringing circuitry and so forth used in the power system of the present invention follow the teachings of similar circuitry used for years in the telecommunications industry. This circuitry is not considered novel and the design of these circuit functions is believed within the capabilities of anyone skilled in the art. Therefore specific circuitry is not shown in the accompanying drawings.

Although the invention has been described with reference to a specific embodiment, such as RTs using SLC type channel banks, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A plug compatible replacement RT (remote terminal) telecommunications power system having a given rated power output comprising:
   a power system enclosure;
   a first AC connector operable to receive AC (alternating current) input to said power system;
   one or more redundant rectifier circuits connected to said AC connector and operable to convert AC to DC (direct current) power, said redundant rectifier circuits being operable to provide rated power output to one or more banks of load circuitry when one of said bridge rectifier circuits fails to meet one or more predetermined operating requirements;
   a second connector operable to provide a plurality of ringer signal outputs;
   a third connector operable to provide a plurality of fused heater outputs;
   a fourth connector operable to provide a plurality of low voltage battery disconnect output signals;
   a fifth connector operable to provide alarm outputs;
   one or more auxiliary load overcurrent protected terminals for broadband circuitry;
   one or more auxiliary battery terminals;
   a sixth connector operable to provide overcurrent protected DC output voltages for use by RT banks of circuitry;
   one or more fasteners for mounting each of said terminals on said enclosure;
   one or more fasteners for mounting each of said connectors on said enclosure;
   temperature compensating battery float voltage circuitry for providing a variable float voltage to maintain connected batteries as a function of temperature, said float voltage circuitry operating to prevent battery charging current from exceeding a predetermined value;
   and a seventh connector connecting an output of said redundant rectifier circuit to supply DC current to both backup batteries and to banks of load circuitry simultaneously.

2. The power system of claim 1, further comprising:
   overcurrent protection devices, connected to said auxiliary battery terminals, for protecting loads connected to said auxiliary battery terminals;
   temperature compensating battery float voltage circuitry operable to prevent battery charging current from exceeding a predetermined value; and
   an eighth connector connecting an output of said redundant rectifier circuits to supply DC current to both backup batteries and to said banks of load circuitry simultaneously.

3. A plug compatible replacement power supply for use in a RT (remote terminal) originally designed to accommodate only POTS (plain old telephone service) channel banks, comprising:
   an enclosure for said power supply sized to fit in said RT;
   connectors, attached to said enclosure, for connection to a standby battery source;
   connectors, attached to said enclosure, for connection to a load comprising at least POTS channel banks;
   circuitry, attached to said enclosure, for permanently connecting at least one load to the standby battery source;
   a plug-in controller, attached to said enclosure, adapted for permitting continuous power supply operation during replacement whereby said controller can be replaced without interrupting customer service;
   modular N+1 rectifier circuits, attached to said enclosure, wherein N of the modular rectifier circuits supplies the rated power output of the power supply when one of the modular rectifier circuits is in a failed state without interruption of customer service;
   variable speed fan powered active heat dissipation means, attached to said enclosure;
   auxiliary battery terminals attached to said enclosure;
   auxiliary load current protected terminals, attached to said enclosure, for connection to broadband service equipment not compatible with the wiring harness connectors of said RT as originally manufactured;
   circuitry, attached to said enclosure, for generating both minor and major alarm signals for failure of one or more of said modular N+1 rectifier circuits;
   circuitry, attached to said enclosure, for adjusting a float voltage supplied to channel bank loads and to said standby battery source as a function of temperature; and
   connectors, attached to said enclosure, for supplying battery heater voltages.

4. Apparatus as claimed in 3 comprising in addition:
   overcurrent protection devices, connected to said auxiliary battery terminals, for protecting loads connected said auxiliary battery terminals.

* * * * *